United States Patent

Morton et al.

[11] Patent Number: 6,058,739
[45] Date of Patent: May 9, 2000

[54] LONG LIFE FUSED SILICA ULTRAVIOLET OPTICAL ELEMENTS

[75] Inventors: Richard G. Morton, San Diego; Richard L. Sandstrom, Encinitas; William N. Partlo, Poway, all of Calif.

[73] Assignee: Cymer, Inc., San Diego, Calif.

[21] Appl. No.: 09/183,220

[22] Filed: Oct. 29, 1998

[51] Int. Cl.[7] .......................... C03C 15/00; C03B 27/012; C03B 32/00; C03B 37/018; C03B 37/01

[52] U.S. Cl. .......................... 65/30.1; 65/30.11; 65/30.14; 65/33.2; 65/392; 65/425

[58] Field of Search .................................. 65/30.1, 30.11, 65/30.14, 33.2, 111, 900, 392, 425

[56] References Cited

U.S. PATENT DOCUMENTS

| | | | |
|---|---|---|---|
| 5,478,371 | 12/1995 | Lemaire et al. | 65/384 |
| 5,616,159 | 4/1997 | Araujo et al. | 65/17.4 |
| 5,908,482 | 6/1999 | Komine et al. | 65/17.6 |

FOREIGN PATENT DOCUMENTS

WO 98/07053  2/1998  WIPO .

OTHER PUBLICATIONS

Borrelli, N.F., Smith, Charlene, Allan, Douglas C., and Seward, III, T. P., "Densification of fused silica under 193–nm excitation", J. Opt. Soc. Am B, vol. 14, No. 7, Jul. 1997, pp. 1606–1615.

*Primary Examiner*—Stanley S. Silverman
*Assistant Examiner*—Jacqueline A Ruller
*Attorney, Agent, or Firm*—John R. Ross

[57] ABSTRACT

The present invention provides a process for substantially extending the useful life of fused silica elements used in high energy ultraviolet optical systems. The fused silica bulk material is pre-compacted by illuminating it with radiation prior to final mechanical fabrication and polishing to the required final surface figure. When the optical element is subsequently used in a high energy ultraviolet environment, it will continue to be compacted but at a lower effective rate. As a result, the useful life of fused silica optical elements can be increased substantially.

In preferred embodiments the fused silica material is pre-compacted with multiple passes of short-pulse ultraviolet radiation. Multiple passes can reduce precompaction time. In one example useful life of the fused silica is increased from about 150 days to 3.8 years by about 5 days of precompaction.

7 Claims, 3 Drawing Sheets

LONG LIFE FUSED SILICA ULTRAVIOLET OPTICAL ELEMENTS

This invention relates to fused silica optical elements and in particular to methods for extending the useful life of such elements in ultraviolet optical systems.

BACKGROUND OF THE INVENTION

Only two materials, $CaF_2$ and fused silica, are currently available for refractive optical components such as lenses for ultraviolet optical systems operating in the wavelength range of about 193 nm which is the nominal wavelength of the ArF excimer laser. CaF is a crystal and is much more difficult to form into optical components than fused silica which has an amorphous molecular structure.

A serious problem associated with fused silica is that various types of radiation including UV radiation will cause it to undergo "densification" or "compaction". This is a serious problem for the makers of stepper and scanner equipment which uses ArF lasers as a light source for integrated circuit lithography. These machines use very high precision lenses to condition the laser beam for printing circuits on silicon wafers. Compaction in the range of a few parts per million for imaging of a photo mask can seriously degrade performance of these lenses.

The densification of fused silica with radiation has been studied thoroughly. See for example N. F. Borrelli, et al., "Densification of fused silica under 193-nm excitation", J. Opt. Soc. Am. B/Vol. 14, No. 7/July 1997 and the many papers cited therein. That study found "that the derived densification follows a universal function of the dose, defined as the product of the number [N] of pulses and the square of the fluence [I] per pulse". FIG. 14 of that report has been reproduced here as FIG. 1. This and other prior art reports suggest methods of reducing the rate of densification such as by decreasing the energy per pulse and increasing the number of pulses.

What is needed is a better method of preparing fused silica to extend the useful life of fused silica optical elements used with high energy ultraviolet light sources.

SUMMARY OF THE INVENTION

The present invention provides a process for substantially extending the useful life of fused silica elements used in high energy ultraviolet optical systems. The fused silica bulk material is pre-compacted by illuminating it with radiation prior to final mechanical fabrication and polishing to the required final surface figure. When the optical element is subsequently used in a high energy ultraviolet environment, it will continue to be compacted but at a lower effective rate. As a result, the useful life of fused silica optical elements can be increased substantially.

In preferred embodiments the fused silica material is precompacted with multiple passes of short-pulse ultraviolet radiation. Multiple passes can reduce precompaction time. In one example useful life of the fused silica is increased from about 150 days to 3.8 years by about 5 days of precompaction.

DETAILED DESCRIPTION OF PREFERRED EMBODIMENTS

Preferred embodiments of the present invention can be described by reference to the drawings.

Precompaction

Applicants have discovered that the useful life of fused silica optical elements such as lenses used for integrated circuit photolithography with ArF 193 nm light sources can be extended very substantially by precompacting the fused silica prior to finishing the optical element. Preferred embodiments of this invention permit sufficient precompaction in a relatively short period of time using a UV light source, to increase useful life by several hundred percent.

Figure 1:
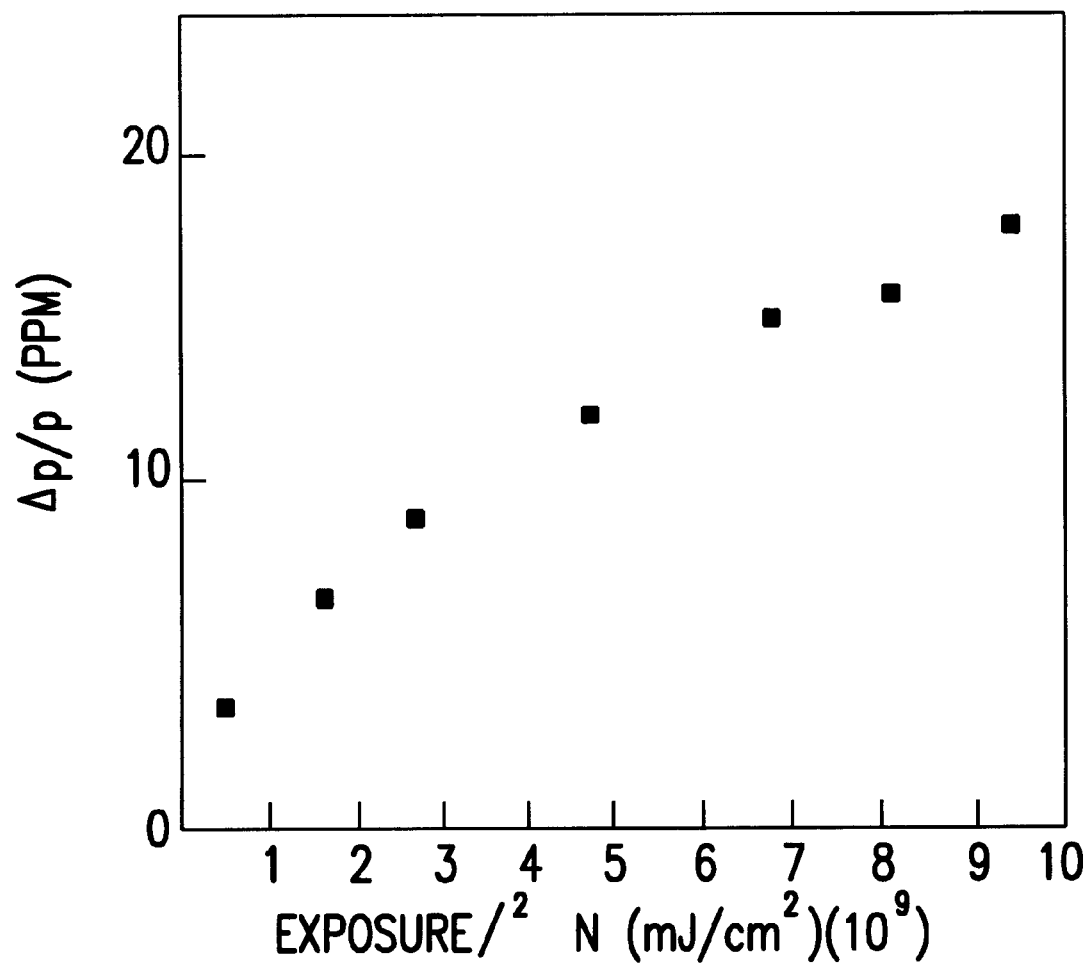
FIG. 1 is a prior art graph showing compaction versus dose.

As indicated in FIG. 1 and confirmed by experiments performed by Applicants and others the rate of change of compaction with continued UV exposure is gradually reduced. Applicants have determined that compaction by pulse UV radiation is a function primarily of the number of pulses, the intensity of the UV light within the fused silica and the pulse width. Applicants have developed the following formula to express compaction in terms of these parameters:

$$C = k(NI^2/t)^b$$

where C is the amount of compaction, measured in parts per million change in the index of refraction of the material;

k is a wavelength dependent constant and which has a value of 0.145 for a UV wavelength of 193 nm, delivered by ArF laser;

N is the number of pulses of laser light, in millions of pulses;

I is the intensity of the light within the material, in $mJ/cm^2$;

t is the integral-square pulse width of the laser pulse, in nanoseconds ($10^{-9}$ seconds). The integral square pulse width is defined by:

$$t = \frac{\left(\int T(t)dt\right)^2}{\int T^2(t)dt}$$

where T(t) is a function which represents the temporal shape of the laser pulse;

b = an exponent which may depend on the material and wavelength, and typically has values ranging from 0.5 to 0.7. For $\lambda = 193$ nm and standard fused silica such as Corning 7940, a good estimate of b is: b=0.52.

Applicants call the group of $(NI^2/t)$ the dose D, and D has the units of $[10^6 \times (mJ/m^2)^2/ns]$. (ns=nanosecond=$10^{-9}$ second). It is the measure of how much irradiation the sample has received. In terms of dose, the compaction C then is given by $$C = kD^b$$

We precompact the sample with a dose $D_0$, resulting in a uniform reactive index change $\delta n_0 = kD_0^b$, that is: the change before the lens is physically fabricated.

Since $\delta n_0$ is done uniformly before the lens is fabricated, it has no effect on the final optical performance of the lens. After the lens is put into service, the change in refractive index caused by continuing UV exposure is:

$\delta n_0 = k(D_0+D)^b$; D being the dose that starts after the precompaction dose $D_0$.

The fabricated lens then experiences a further change of index, $\Delta n$, over and above the precompaction index change $\delta n_0$:

$$\Delta n = \delta n - \delta n_0 = k[(D_0+D)^b - D_0^b].$$

D represents the dose that the lens must withstand during its service lifetime. If $\Delta n$ is the maximum amount of further compaction that the optic can tolerate and still meet its imaging performance specifications, the equation can be numerically solved for the required precompaction $D_0$. The equation to be solved for $D_0$ is:

$$(D_0+D)^b - D_0^b - \Delta n/k = 0. \qquad \text{equation 1.}$$

When solving for $D_0$ we must note that the range of D is constrained by the limiting case $D_0=0$, which of course represents no precompaction.

Solutions for equation 1 in this limiting case have been derived as a function of $\Delta n$ and as a function of D using the values of k and b specified above. The results are shown graphically for these two classes of solution in FIGS. 2 and 3, respectively.

Figure 2:
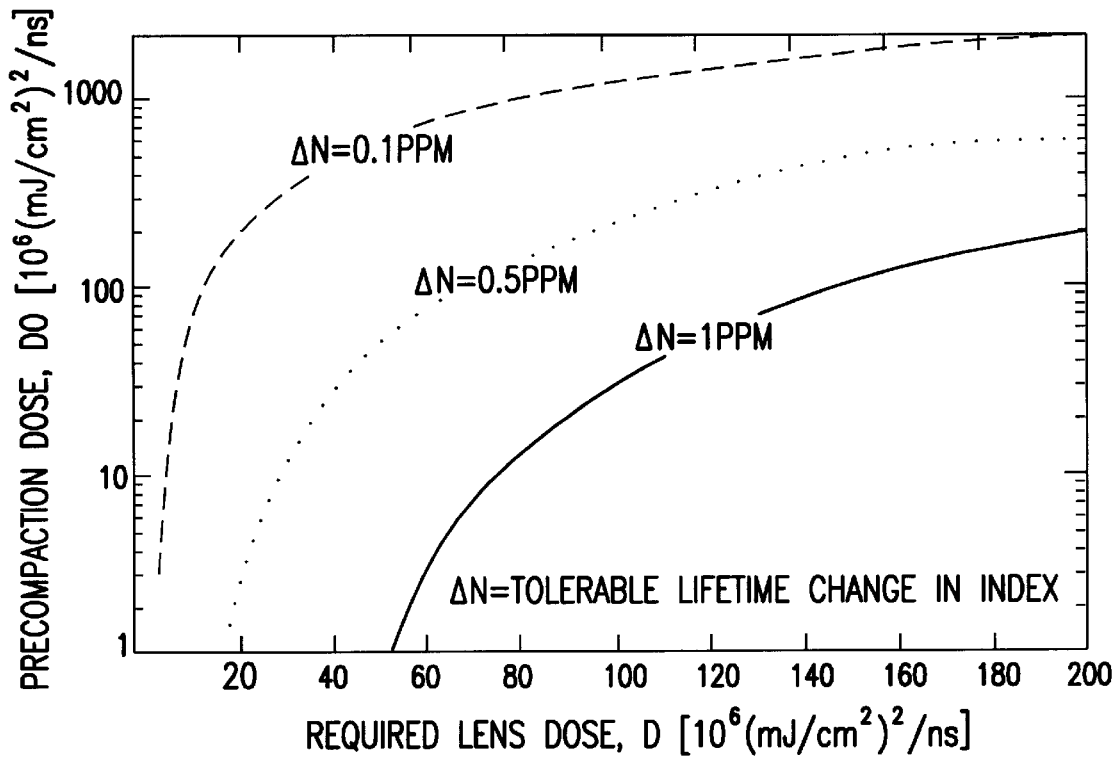
FIGS. 2 and 3 relate precompaction dose to useful life dose and allowable compaction.

FIG. 2 shows a plot of the required service dose, D, against the required precompaction dose, $D_0$, with the parameter $\Delta n$ being assigned the range of values 0.1, 0.5, and 1.0 ppm. Parameter $\Delta n$ is the tolerable change in refractive index during the service life of the optic.

As an example of a regime in which precompaction is practical and useful, consider an optic whose maximum allowed $\Delta n$ is 0.5 ppm.

If no precompaction is performed, $D_0=0$ and equation 1 reduces to:

$$D^b = \Delta n/k$$

and $$D = (0.5/0.145)^{1/0.52}$$

$$D = 10.8 \times 10^6 \text{mJ}^2/\text{cm}^4\text{ns}$$

This dose can be converted to number of pulses by:

$$N = Dt/I^2$$

If we assume $I=0.1$ mJ/cm$^2$, and
$t=30$ ns, $$N = \frac{(10.8 \times 10^6 mJ^2/cm^4 ns) 30 ns}{(0.1 mJ/cm^2)^2}$$

$$N = 3.240 \times 10^9 \text{ pulses}$$

At a pulse rate of 1000 Hz and a duty cycle of 0.25 the lens would last about 150 days.

If, on the other hand, the material from which the lens is fabricated is precompacted with a dose $D_0=100$ units (i.e., $10^8$mJ$^2$/cm$^4$-ns), the service life will be about $D=70$ units (i.e., $70 \times 10^6$mJ$^2$/cm$^4$-ns). This represents an extension of useful lifetime (assuming the same $I=0.1$ mJ/cm$^2$, $t=30$ ns and a 0.25 duty factor) to about $21 \times 10^9$ pulses or about 2.7 years. In general, the more sensitive a component is to refractive index changes the more beneficial precompaction becomes.

It should be realized that the service dose D is delivered in a single pass through the lens, while the optic is exposing wafers. In order to maximize lifetime, the optical designer will design the lens so that the intensity I is kept as low as possible. In addition, the producer of the laser source will make the integral square pulse width t as long as possible (typically 30 ns).

By contrast, the setup used to perform precompaction is very different. The light from the source laser can be passed through the optical blank many times, thereby increasing the intensity of the light and increasing the rate of compaction approximately as the square of the number of passes. Equivalently, the precompaction light can be focused into a small high intensity spot, and the sample irradiated in many small area segments, to take advantage of the fact that compaction is a function of intensity squared. In addition, the pulse width of the laser used to do the precompaction can be made as short as possible, typically less than 10 ns. These strategies give great leverage to each pulse delivered by the laser, and lead directly to the preferred embodiments.

Figure 3:
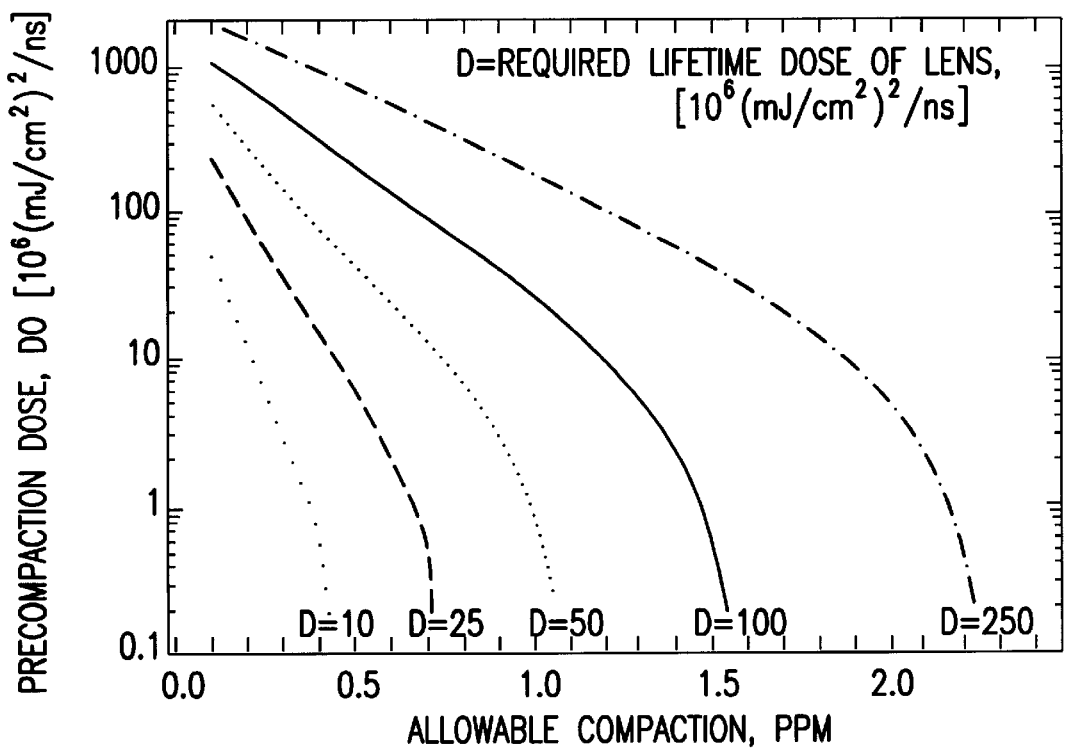

Conversely to the equation 1 solutions shown in FIG. 2, in FIG. 3 we see a plot of tolerable compaction versus required precompaction dose; this time the parameter being the required service dose D. Again, as an example of the regime in which precompaction is useful, consider the optic with an allowed compaction is 1.08 ppm. For zero precompaction the lifetime is about 50 units. If, however, it is precompacted to a dose $D_0=100$ units, the amount of compaction after the required dose $D=50$ units will only be 0.35 ppm.

This will allow the optic to run out to $D=150$ units before reaching the maximum allowable compaction of 1.08 ppm, which translates to an increase in service life (using the above assumptions) of almost 5.7 years.

Precompacting with UV

Applicants have proven that the best way to deliver a precompaction dose to a particular sample is to irradiate small areas in succession, to multipass the photons through the same volume as many times as possible, and to use the shortest possible pulse widths for a given energy. All three of these tenets come from the fact that the induced compaction is a function of the intensity squared. The mathematical basis for this is described below.

Suppose that A is the total cross sectional area of the lens blank to be irradiated.

If the area A is divided up into M subregions for sequential irradiation sessions, the number of pulses, Ns, necessary to deliver a dose $D_0$ to the subregion is:

Ns=$D_0t/I^2$ pulses, where t=laser pulse width and I is the energy delivered per unit area.

Now $I=E/(A/M)=EM/A$ with E being the laser pulse energy, so that the number of pulses needed, Ns, to expose the subregion is:

$$Ns = D_0 t A^2/M^2 E^2.$$

Since there are M subregions, the total pulse count will be:

$$N = MNs = D_0 t A^2/ME^2.$$

Thus, the number of pulses required to compact the entire area A goes as 1/M.

For example, irradiation of the entire area when $A=491$ cm$^2$ (diameter of optic=25 cm) is:

$$N = D_0 t A^2/E^2 \text{ (since M=1)}.$$

Further assuming that we want $D=100$ units and $\Delta n=0.5$ ppm (allowed compaction change) the $D_0$ is 200 from FIG. 2 or FIG. 3, and with a laser pulse width t=10 ns (integral-square definition*) and an E of 50 mJ/pulse, we obtain:

N=192×10⁹ pulses. At 1000 Hz and 100% duty factor this would take 6 years.

By comparison, if we divide the area A up into M=100 subregions we get:

N=1.92×10⁹ pulses. This requires only about 22 days. With a double pass system as shown in FIG. 4, this time could be reduced to about 5 days.

A dose of $100 \times 10^6 mJ^2/cm^4 ns$ at an intensity of about 0.1 $mJ/cm^2$ and pulse width of 30 ns and a 25 percent duty cycle is equivalent to about 3.8 years of operation as compared to the 150 days in the example given above based on the use of pristine fused silica Thus, 5 days of precompaction can extend the life of a fused silica optical elements from about 150 days to almost 4 years. The 5 day period was calculated based on a double pass.

Figure 4:
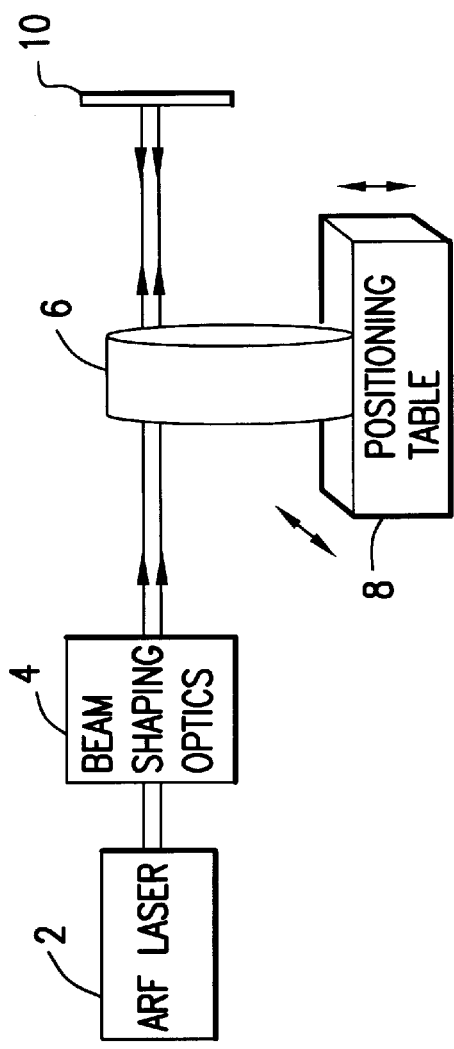
FIGS. 4 and 5 show sketches of precompaction systems.

The system shown in FIG. 4 includes ArF laser 2, beam shaping optics 4, fused silica blank 6 on x and y translation table 8 and mirror 10.

Figure 5:
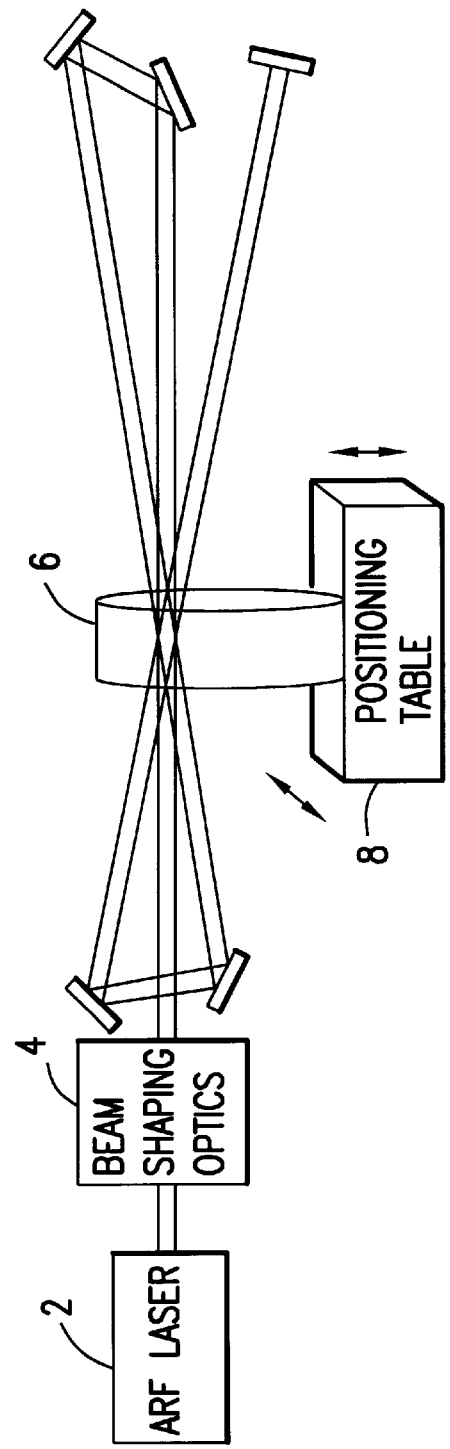

FIG. 5 shows a system for 6 passes through the blank. Mirror 12 should be very slightly tilted so that the return beam does not reenter the aperture (not shown) of beam shaping optics 4.

As explained above, it takes about 100× less laser output energy and 100× less elapsed time to treat the optic in the 100-subregion manner. An additional important benefit to the subregion method is that if the spatial intensity distribution which will illuminate the finished lens is known, the opportunity exists to custom precompact the lens blank to further reduce the effects of continuing compaction in service.

Several techniques are possible for treating the fused silica with the arrangements shown in FIGS. 4 and 5. One technique would be to illuminate one volume until it is completely treated to the required $D_0$ then move to the next. Another approach is to step the target across a relatively larger area many times or to scan the target continuously in the beam.

Treatment is used damage usually appears first at the beam exit surface of the fused silica blank. Applicants have noted damage at intensity levels of 200 $mJ/cm^2$ with a 20 ns pulse width but no damage at intensity levels in the range of 80 $mJ/cm^2$ with 20 ns pulse width. Applicants preferred peak power density for the narrow laser beam is between about 1 $MW/cm^2$ and about 7.5 $MW/cm^2$.

Short and Long Pulse Width Experiments

Applicants have compacted fused silica samples with 30 ns pulses and 13 ns pulses and have confirmed that the shorter pulse width required about half the number of pulses of approximately equivalent energy to achieve the same degree of compaction as the longer pulse width. These results support the general conclusion that precompaction should be done with short pulse width pulses and operation of the stepper-scanner machines should be done with longer pulse width.

Solarization Removal

A second aspect of the invention is the ability to remove solarization induced during precompaction of fused silica. UV radiation on fused silica not only produces compaction as discussed above, it also produces color centers in the material which increases the absorption of the material and reduces the efficiency of the optical elements. This process is called solarization. Solarization is produced in the process of precompaction but Applicants have proven through actual experiments that this solarization can be removed without affecting the precompaction.

In the compaction experiment, a piece of Corning 7940 was exposed at approximately 28 $mJ/cm^2$ for a total of 711 Mshots. The laser irradiation produced a compaction of approximately 2.7 ppm. The sample was also heavily solarized as evidenced by the bright red fluorescence.

The sample was then put in an oven and heated up to 750° C., held at that temperature for an hour and then allowed to cool slowly over a period of at least 12 hours. This removed all traces of the solarization (no visible red fluorescence any more when placed in laser beam) and all traces of the compaction. The interferogram of the sample then looked exactly the same as when the sample was new—no defects. Glass viscosity varies drastically with temperature. At room temperature the compaction in fused silica is not reversed, even after ten years on the shelf.

The sample was again irradiated, this time at approximately 80 $mJ/cm^2$ for a total of 69 Mshots. Again, the piece was heavily solarized and showed a compaction of approximately 2.7 ppm (agrees with $1^2$ or 2-photon dependence model.) This time the sample was heated up to 400° C., held at that temperature for an hour, and then slowly cooled as before.

This treatment removed all traces of the solarization but removed little, if any, of the compaction as evidenced by the Zygo interferogram. Other bake temperatures and schedules are also possible for optimization of the particular optic being processed.

Persons skilled in the optical arts will recognize that many changes may be made to the specific embodiments shown without departing from the true spirit of the invention. For example, other forms of radiation such as x-ray, gamma ray or neutron radiation could be used to precompact the fused silica. As indicated above, if the radiation is a pulse laser beam, the pulse width should be very short. Lasers with pulse widths of less than 15 ns are readily available. Widths in the range of 10 ns or less are even better. Thus, the scope of the invention is to be determined by the appended claims and their legal equivalents.

What is claimed is:

1. A process for treating fused silica to increase lifetime of an optical element used in high energy ultraviolet systems comprising the steps of:

A. prior to completing the fabrication of the optical element defining a useful volume uniformly illuminating the fused silica over the useful volume of the fused silica with sufficient ultraviolet radiation to precompact the fused silica enough to increase the index of refraction by at least 0.1 parts per million, B. after completion of step A, heating the precompacted fused silica to remove solarization effects produced by said radiation;

C. completing the fabrication of the optical element; and

D. utilizing the optical element in an environment exposing the component to at least 10 billion pulses of UV radiation at intensities of at least 3.3 $KW/cm^2$ per pulse.

2. The process as in claim 1 wherein said ultraviolet radiation is a pulsed laser beam produced by an excimer laser.

3. The process as in claim 1 wherein said pulsed laser beam is a beam of pulses having an integral square pulse width of less than 15 ns.

4. A process as in claim 3 wherein said pulse width is about 10 ns.

5. A process for precompacting fused silica to increase lifetime of optical elements made from said fused silica comprising the steps of:

A. illuminating successive portions of said fused silica with a narrow pulsed ultraviolet laser beam having a power density in said fused silica of between 1.0 MW/cm$^2$ and about 7.5 MW/cm$^2$ until said fused silica has been precompacted to a desired extent to produce precompacted fused silica, B. after completion of step A, heating the precompacted fused silica to remove solarization effects produced by said radiation;

C. utilize the precompacted fused silica to produce an optical element;

D. utilize the optical element in an environment exposing the component to at least 10 billion pulses of UV radiation at intensities of at least 3.3 KW/cm$^2$ per pulse.

6. The process as in claim 5 wherein said pulsed laser beam is provided by an ArF excimer laser.

7. A process as in claim 5 and further comprising the steps of arranging a path for said laser beam so as to cause each pulse of said beam to a plurality of passes through preselected sections of said fused silica.

* * * * *